United States Patent [19]

Macrander

[11] 3,714,548

[45] Jan. 30, 1973

[54] D.C. COMPENSATION CIRCUIT FOR MINIATURE TRANSFORMERS

[75] Inventor: Max S. Macrander, Warrenville, Ill.

[73] Assignee: GTE Automatic Electric Laboratories Incorporated, Northlake, Ill.

[22] Filed: Nov. 17, 1971

[21] Appl. No.: 199,464

[52] U.S. Cl. ........................323/48, 323/62, 325/493
[51] Int. Cl. ..........................H01f 13/00, H01f 19/02
[58] Field of Search ..........323/44 R, 48, 62; 325/493

[56] References Cited

UNITED STATES PATENTS 3,384,810 5/1968 Kelsey ..................................323/48

*Primary Examiner*—A. D. Pellinen
*Attorney*—K. Mullerheim et al.

[57] ABSTRACT

A d.c. compensation circuit for insertion in a miniature transformer to substantially compensate any d.c. magnetization and permit elimination of the requirement for an air gap. A.c. currents are, however, passed without significant attenuation.

7 Claims, 1 Drawing Figure

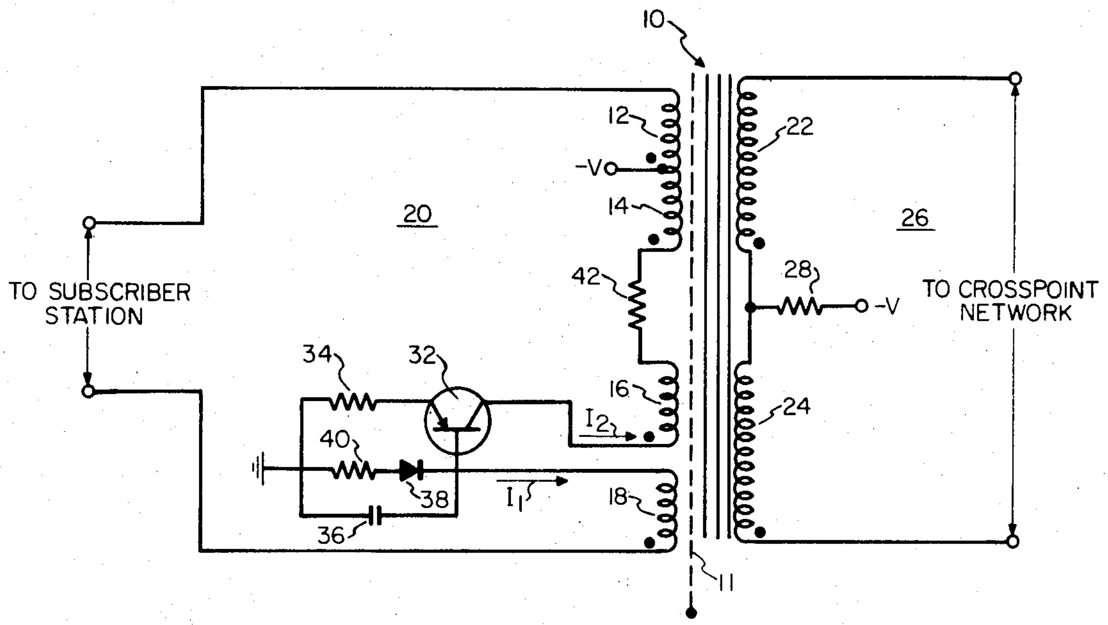
INVENTOR
MAX S MACRANDER
BY Robert Van Epps
ATTORNEY

D.C. COMPENSATION CIRCUIT FOR MINIATURE TRANSFORMERS

BACKGROUND OF THE INVENTION

1. Field of the Invention

The present invention relates generally to the field of electric transformers and more particularly to a circuit for providing d.c. magnetic field compensation in miniature transformers.

2. Description of the Prior Art

In many applications of transformer technology to modern electronic systems conditions exist where a substantial d.c. component is present at one or both sides of the transformer in addition to the a.c. signals that are to be coupled therethrough. Typically, under such circumstances it is necessary to use a transformer with an air gap to avoid d.c. saturation. As an example of such an application, it has long been known that the cost and space savings involved in applying the bistable semiconductor switch (thyristor) technology to telephone switching systems would be very advantageous. Unfortunately, however, due to a requirement for a d.c. separation transformer to separate the subscriber loop from a semiconductor crosspoint switching system, much of this space saving was lost. In order to prevent saturation of the separation transformer by the subscriber loop current (approximately 60 milliampere) it has previously been required that the transformer be provided with a substantial air gap. As a result of this requirement the transformer becomes unduly bulky and expensive thus negating the space and cost savings which could otherwise be achieved through the use of semiconductor switches.

OBJECTS AND SUMMARY OF THE INVENTION

From the foregoing discussion it will be apparent that among the various objectives of the present invention are included the following:

the provision of a new and novel circuit for use in miniature electric transformers which provides compensation of d.c. magnetic fields in such transformers;

the provision of apparatus of the above-described character which does not significantly attenuate a.c. currents;

the provision of apparatus of the above-described character which permits use of separation transformers without any substantial air gap; and the provision of apparatus of the above-described character which is of particular utility as an interface between the subscriber loop and semiconductor crosspoints of a telephone switching system.

These as well as other objectives of the present invention are efficiently achieved by providing a separation transformer having no substantial air gap at the interface of the subscriber and crosspoint loops of a telephone system. A d.c. compensating circuit is inserted between the transformer windings on either or both the primary and secondary sides. The compensating circuit provides magnetic field cancellation of the d.c. field produced by the d.c. currents, but allows a.c. currents to pass without significant attenuation.

The preceding and other objects, features and advantages of the present invention will become more apparent from the following detailed description taken in conjunction with the appended drawing.

BRIEF DESCRIPTION OF THE DRAWING

The single appended drawing is a schematic diagram of an electric transformer incorporating a d.c. compensation circuit in accordance with the principles of the present invention.

DESCRIPTION OF PREFERRED EMBODIMENT

For the purposes of illustration the invention will be described in the context of an interface circuit for use between a telephone subscriber loop and a semiconductor crosspoint switching network although it will be seen that it is of much wider application in the general field of electric transformers. Turning now to the appended Figure there is schematically shown a separation transformer 10 having an optional shield 11, windings 12, 14, 16 and 18 in the subscriber loop 20 and windings 22 and 24 in the crosspoint loop 26. Transformer winding sense is indicated with the conventional dot notation. The conventional supply voltage, −V, is supplied to the subscriber loop between transformer windings 12 and 14 and to the crosspoint loop via input resistor 28 to transformer windings 22 and 24. The value of −V may be the typical −48 volt central office battery commonly used in the usual telephone system, however, it will be understood that operation of the present invention is not limited to such voltage.

A d.c. compensating circuit is inserted between subscriber loop transformer windings 16 and 18. A transistor 32 has its collector coupled to the input of subscriber loop transformer winding 16, emitter coupled via resistor 34 to ground potential and base coupled to the output of subscriber loop transformer winding 18, through capacitor 36 and through diode 38 and resistor 40 to ground potential. Diode 38 is provided to compensate for the emitter-base voltage drop in transistor 32. An additional resistor 42 is coupled between subscriber loop transformer windings 14 and 16 to limit the dissipation of transistor 32 and its value is preferably selected such that transistor 32 does not saturate. It will be understood, however, that if transistor 32 were of the high power type the use of resistor 42 would become unnecessary. In effect there is thus provided a first or subscriber loop including transformer windings 12 and 18 and a second or auxiliary transformer loop including windings 14 and 16.

Assuming a transistor 32 with a transport efficiency of 100%, the ratio of d.c. current, $I_2$, flowing in the auxiliary transformer loop to the d.c. current, $I_1$, flowing in the subscriber loop is equal to the ratio of the resistances of resistor 40 ($R_{40}$) to resistor 34 ($R_{34}$). This ratio is selected such that the d.c. ampere-turns of the subscriber loop is substantially equal to that of the auxiliary transformer loop; i.e.

$$(W_{12}+W_{18})\,I_1=(W_{14}+W_{16})\,I_2 \qquad 1$$

wherein $W$ is the number of turns in the transformer winding corresponding to the particular subscript. Due to the effect of the transistor base current, which is dependent upon the transistor transport efficiency, a slight correction in the ratio of resistances $R_{40}$ to $R_{34}$ may be required. If, however, the transistor 32 is selected to have a transport efficiency of at least 98° percent, the maximum difference in the d.c. ampere-turn products in the subscriber and auxiliary transformer loops due to transistor base current is less than four percent, which is usually sufficiently small to be neglected in actual practice. It will thus be seen that by selecting the values of resistors 34 and 40 to be substantially equal the currents $I_1$ and $I_2$ in the subscriber loop and auxiliary transformer loop will be made equal by selecting the transformer 10 such that $$W_{12}+W_{18}=W_{14}+W_{16}.$$

With this arrangement there can be no net d.c. magnetization.

The value of capacitance 36 is selected such that the shunt impedance of the d.c. compensating circuit is negligible for any a.c. signals of a frequency at least equal to the inverse of the $R_{40}C_{36}$ product; i.e., there will be negligible losses for a.c. signals of a frequency $$f \geqslant 1/2\pi(R_{40}C_{36}) \quad 2$$

wherein $f$ is the a.c. signal frequency, $R_{40}$ is the value of resistor 40 and $C_{36}$ is the value of capacitor 36. Thus a.c. signals, which may, of course, be speech, other analog data or digital data, are transmitted to the cross-point side of the transformer 10 without any substantial attenuation. It is further desirable in some instances, such as back to back operation of two such transformers, to select the value of capacitance 36 such that the low corner frequency point is optimized from the standpoint of compensating low frequency losses due to the inherent inductance of transformer 10.

In operation in a telephone system, when the subscriber's phone is off-hook, a d.c. loop current, $I_1$, will flow through windings 12 and 18 of transformer 10 and an equal amount of current will flow through windings 14 and 16 whenever transistor 32 is in the active or conducting state. Thus there will be no net d.c. field generated in the primary or subscriber loop windings. A.c. signals, however, flowing in windings 12 and 18 do not produce any opposing fields in windings 14 and 16 since a.c. signals will bypass transistor 32 through capacitor 36 and induce a.c. currents in the secondary windings 22 and 24 of transformer 10.

By way of illustrative example, in an actual embodiment of the invention found by the Applicant to provide the features and advantages set forth hereinabove the following circuit elements and values were used:

- a conventional ferrite core transformer 10 having $W_{12}=W_{14}=W_{16}=W_{18}=$ 165 turns and $W_{22}=W_{24}=$ 330 turns;
- $R_{28}=$ 220 ohms;
- a conventional pnp transistor 32;
- $R_{34}=R_{40}=$ 50 ohms;
- $C_{36}=$ 8.2 microfarads; and
- $R_{42}=$ 500 ohms.

The low corner frequency of this circuit was thus set to 400 Hz at which frequency the insertion loss at back to back operation of two such circuits was found to be minimized. With a subscriber loop resistance of 600 ohms the subscriber loop current, $I_1$ and auxiliary transformer loop current $I_2$ were both approximately 60 milliamperes. The Applicant observed the circuit to provide substantially complete d.c. magnetization compensation and to have transmission losses at 400 Hz which were within 0.1 db of those at the standard measurement frequency of 1 KHz.

The foregoing illustrative example is not to be considered as limiting the invention to the given circuit parameters. In the event that a given application makes parameter variations desirable they may be accomplished without abandoning the principles of the invention. Further, although the present invention is described in an application to a telephone system it is of equal utility in providing effective d.c. compensation in any transformer application. Finally it is to be understood that in the event that an unbalanced d.c. component exists at both sides of a transformer a second circuit of the same configuration as described hereinabove may be used on the other side of the transformer. In this manner the effects of d.c. may be cancelled from both sides of a single transformer.

From the foregoing it will be seen that the Applicant has provided a d.c. compensation circuit for miniature transformers whereby the objectives set forth hereinabove are efficiently met. Since certain changes in the above-described construction will occur to those skilled in the art without departure from the scope of the invention it is intended that all matter contained in the preceding description or shown in the appended drawing shall be interpreted as illustrative and not in a limiting sense.

Having described what is new and novel and desired to secure by Letters Patent, what is claimed is:

1. A d.c. compensated electric transformer comprising
   primary and secondary windings,
   means for separating the windings of at least one side of said transformer into first and second electrical loops,
   means for introducing a d.c. voltage into said separated windings intermediate said first and second loops to thereby produce a first d.c. current in a first direction in said first loop,
   a d.c. compensation circuit coupled between said first and second loops for producing a second d.c. current in said second loop in a direction opposed to said first direction, said compensation circuit including first and second current balancing resistors coupled to ground potential, a diode having its anode coupled to said first resistor and its cathode coupled to said first loop, and a pnp transistor having its emitter coupled to said second resistor, its collector coupled to said second loop, and its base coupled to said first loop,
   the ampere-turn product of said first d.c. current in said first loop being substantially equal to the ampere-turn product of said second d.c. current in said second loop such that d.c. magnetic fields in said transformer are substantially cancelled,
   means for introducing a.c. signals into said first loop, and
   means through which said a.c. signals bypass said d.c. compensation circuit without substantial attenuation.
2. Apparatus as recited in claim 1 further including
   a capacitance coupled at one side to ground potential and at the other side to said first loop.
3. Apparatus as recited in claim 1 wherein
   the resistances of said first and second resistors are substantially equal.
4. Apparatus as recited in claim 1 further including a resistance inserted in the windings of said second loop, and operative to substantially prevent saturation of said transistor.

5. Apparatus as recited in claim 1 wherein the transport efficiency of said transistor is at least 98° percent.

6. Apparatus as recited in claim 2 wherein the resonant frequency of said compensation circuit is no greater than 400 Hz such that the a.c. impedance thereof for frequencies of at least 400 Hz is substantially negligible.

7. Apparatus as recited in claim 1 wherein said d.c. voltage is 48 volts of negative polarity.

* * * * *